United States Patent [19]

Maxwell

[11] Patent Number: 4,697,476
[45] Date of Patent: Oct. 6, 1987

[54] PLANETARY WORM GEAR APPARATUS, AND METHODS OF CONSTRUCTING AND UTILIZING SAME

[76] Inventor: Richard L. Maxwell, 30780 Sibley, Romulus, Mich. 48174

[21] Appl. No.: 637,761

[22] Filed: Aug. 6, 1984

[51] Int. Cl.$^4$ .......................... F16H 3/70; F16H 57/10
[52] U.S. Cl. ........................................ 74/785; 74/788; 74/789; 74/792
[58] Field of Search ................. 74/785, 788, 789, 792, 74/724, 750 R, 424.8 C, 790

[56] References Cited

U.S. PATENT DOCUMENTS

| 1,879,921 | 9/1932 | Clohecy | 74/790 |
|---|---|---|---|
| 2,259,437 | 10/1941 | Dean | 74/785 |
| 2,583,299 | 1/1952 | Lloyd et al. | 74/785 X |
| 2,931,242 | 4/1960 | Pickles | 74/724 X |
| 3,055,237 | 9/1962 | Magnuson | 74/789 |
| 3,106,997 | 10/1963 | White | 72/785 X |
| 3,115,791 | 12/1963 | Dean | 74/785 X |
| 3,696,691 | 10/1972 | Titt | 74/750 R X |
| 4,016,779 | 4/1977 | von Greyerz | 74/724 |
| 4,092,946 | 6/1978 | Kappas | 74/785 X |
| 4,408,746 | 10/1983 | Marsch et al. | 74/792 X |
| 4,416,430 | 11/1983 | Totten | 74/789 X |
| 4,491,037 | 1/1985 | Bullock | 74/785 |

FOREIGN PATENT DOCUMENTS

513578  10/1939  United Kingdom ............ 74/750 R

Primary Examiner—Lawrence Staab
Assistant Examiner—Dwight G. Diehl
Attorney, Agent, or Firm—Anthony L. Cupoli

[57] ABSTRACT

A gear assembly having a primary worm; a planetary worm/gear engaging said primary worm; and a split ring, internal double enveloping worm gear surrounding and engaging said planetary worm/gear. The planetary worm/gear is attached to a planetary carrier on a planetary support shaft which allows the planetary worm/gear to rotate thereon. Primary worm input is utilized. Output may be taken from the planetary carrier or the split ring, internal, double enveloping worm gear.

6 Claims, 29 Drawing Figures

PLANETARY WORM GEAR APPARATUS, AND METHODS OF CONSTRUCTING AND UTILIZING SAME

BACKGROUND OF THE INVENTION

1. Field of the Invention

The present invention relates generally to the field of gear reduction apparatus. More particularly, the invention relates to internal, double enveloping planetary worm gear double reduction devices.

2. Description of the Relevant Art

A number of devices are known which translate a high speed, low power input into a low speed, high power output. This multiplication of the input twisting force (i.e. torque) through a sacrifice in input speed is achieved through a process known as gear reduction.

A typical planetary gear reduction consists of three concentric parts: a sun gear at the center, an internal gear, and an intermediate carrier. The carrier has a set of planetary gears which engage both the internal gear and the sun gear. In operation, input power may be applied to the internal ring, the planetary gears on the carrier or the sun gear, and the output may be taken from either of the other two members with the third member remaining stationary. By virtue of the concentric design the central axis for the input, the output, and the stationary member, is also the axis of rotation.

Each of the above gears is essentially a circular member having a spaced array of teeth. The teeth and the spaces between them are arrayed to engage the teeth and spacing situated on the gear it interacts with. Since the gears are essentially circular each interacting gear effectively rolls in the same plane and in relation to each other. Thus the gears rotate in a plane which is essentially perpendicular to the input and output shafts.

In addition to planetary gear reduction, reduction also has been accomplished utilizing worm gear sets. Worm gear sets generally consist of a worm and a worm wheel. The worm has screw-like threads cut upon its surface and the worm wheel includes gear teeth spaced about its circumference designed to engage the threads of the worm wheel. The worm is tangent to the circumference of the worm wheel. Thus the axis of rotation of the worm gear is perpendicular to the axis of rotation of the worm wheel.

In operation, the threads on the worm engage the teeth on the worm wheel. Thus, as the worm rotates, the worm wheel is driven in a circular path through a sliding action between the threads and the teeth.

The most basic worm gear assembly utilizes a single throated worm gear set. In this set, the throated portion of the worm wheel envelops the worm. The envelopment is such that effectively only one tooth of the worm wheel is engaged at one time by the worm.

A more advanced worm gear assembly utilizes a double enveloping worm gear set. This consists of an hour glass shaped worm and a throated worm wheel. The hour glass shape of the worm provides a second envelopment. Consequently, this gear set is called a double enveloping worm gear set. The double envelopment provides for multiple tooth engagement. Thus the double enveloping gear set is inherently stronger than the single throated worm gear set.

The invention disclosed in this application is an internal double enveloping, planetary worm gear set. It incorporates features which represent an advancement over the both double enveloping worm gear sets and the planetary gear sets discussed above. A principal advantage afforded is an increase in the number of teeth utilized at any one time. This allows the use of a smaller gear set than has been used before. Additionally, this invention allows the utilization of the diameter of the worm wheel, whereas previous worm gear sets could utilize only the radius.

SUMMARY OF THE INVENTION

The present invention includes an internal, double enveloping, double reduction worm gear reduction.

In a preferred embodiment, the invention includes an input shaft having a coaxial input worm affixed to an end of said input shaft. Said input shaft is supported in a gear housing at one end by a journal thrust bearing and the other end of said input shaft is supported by a second journal thrust bearing located in said gear housing. In other embodiments, the input shaft is supported at one end by said gear housing and at the other end by a planetary carrier; or at both ends by a planetary carrier.

The invention also includes a planetary carrier having a planet or group of planets thereon. Preferably, there will be two planets on said carrier.

A planet is preferably barrel shaped, having a first end, a second end, a first exterior section adjacent said first end, a second exterior section adjacent said second end, and an exterior mid-section intermediate said first section and said second section.

A shaft receptacle passes from one end of said barrel-like planet to and through the other end of said barrel-like planet. Each of said ends is designed to receive journal thrust bearings. A support shaft for said planet is received into and through said shaft receptacle. Said journal thrust bearings are located on and support said shaft for rotation.

A set of gear teeth are cut on an essentially circular path about the mid section, about the circumference, of said barrel-like planet. These teeth are designed to engage the input worm. Thus the planet is a planetary gear.

Threads are cut on the first exterior end section and on the second exterior end section. These threads are designed to engage a double enveloping internal worm gear. Thus, the planet, in addition to being a planetary gear is also a planetary worm. For convenience, the term planetary worm/gear is applied to this planet as this device is both a gear and a worm.

An internal, double enveloping worm gear defines the path of the planetary worm/gear.

Thus, there is a first reduction from the input worm to the planetary worm/gear; a second reduction from the planetary worm/gear to the internal, double enveloping worm gear; and a third reduction from the planet to the worm by the relative motion of the planetary worm gear about the worm is present, if all threads and gear teeth are right handed, or all threads and gear teeth are left handed.

BRIEF DESCRIPTION OF THE DRAWINGS

FIG. 14 is a end view of an embodiment of the invention.

FIG. 14a is a view of the embodiment of the invention of FIG. 14 taken along line 14a—14a.

FIG. 15 is an end view of another embodiment of the invention.

FIG. 15a is a view of the embodiment of the invention of FIG. 15 taken along line 15a—15a.

FIG. 16a is a view of the embodiment of the invention of FIG. 16 taken along line 16a—16a.

FIG. 17a is a view of the embodiment of the invention of FIG. 17 taken along line 17a—17a.

DESCRIPTION OF THE PREFERRED EMBODIMENTS

Figure 1:
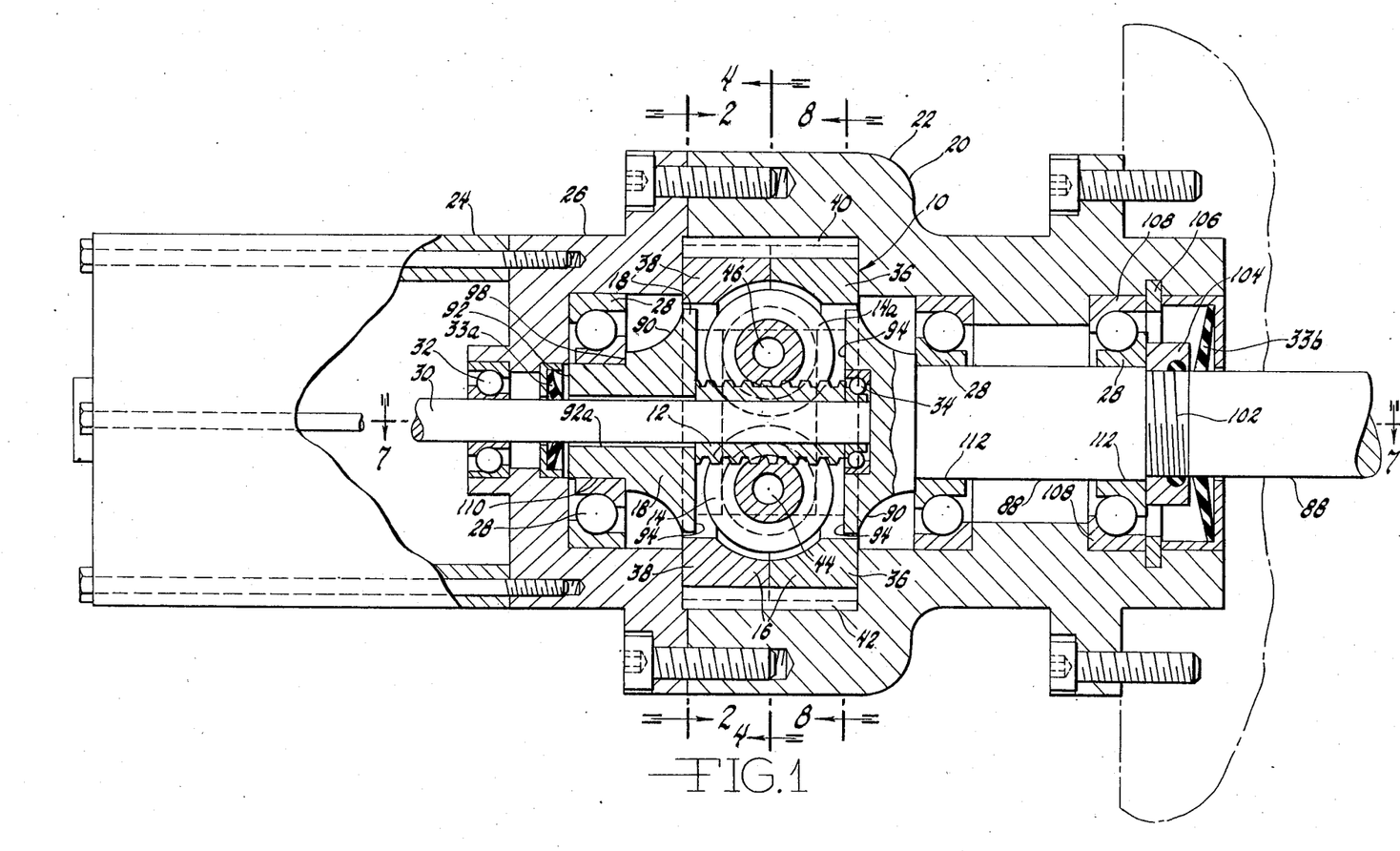
FIG. 1 is a cross sectional view of an embodiment of the invention.

As depicted in FIG. 1, the invention is a gear assembly 10 having an input (i.e. primary) worm 12 operatively connected to first planetary worm/gear 14; second planetary worm/gear 14a; a split ring, internal, double enveloping worm gear 16 operatively connected to said planetary worm/gears 14-14a; and a planetary carrier/output shaft 18 upon which said planetary worm/gears 14-14a reside.

The gear assembly 10 may be secured in a gear box 20. Gear box 20 may include a gear housing 22, a motor housing 24, and an intermediate motor-gear housing 26 which facilitates alignment and joining of the motor and gears.

Gear assembly 10 resides in gear box 20 and is journaled therein, by journal thrust bearings 28, to allow rotation only.

Input shaft 30 communicates at one end with the motor (not shown). The other end of input shaft 30 is coaxial with, and rigidly affixed to, the primary worm 12.

Intermediate said input worm 12 and said motor, input shaft 30 is journaled in said motor gear housing 26, by forward journal thrust bearing 32, to allow rotation only. Input 33a and output seal 33b are provided.

Input shaft 30 is also journaled in planetary carrier 18, by rear journal thrust bearing 34, to allow rotation only.

Figure 2:
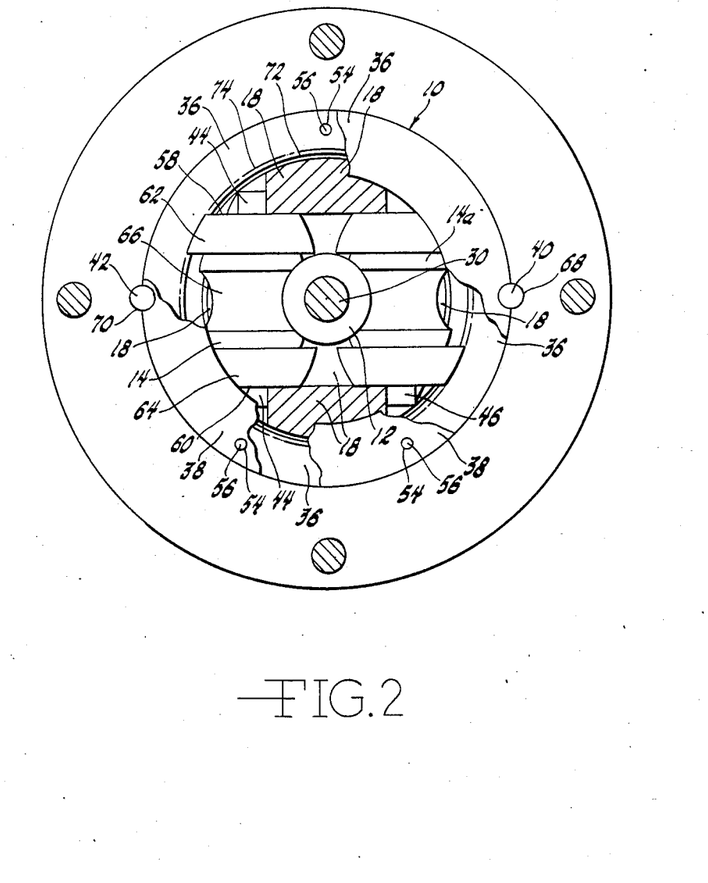
FIG. 2 is a cut away sectional view of an embodiment of the invention taken along line 2—2 of FIG. 1.

As depicted in both FIG. 1 and FIG. 2 split ring, internal, double enveloping worm gear 16 is a split ring composed of a first ring 36 and a second ring 38. First pin 40 and second pin 42, located 180° apart from first pin 40, penetrate the first and second ring 36 and 38 and gear housings 22 and 26 to prevent rotation of the first and second ring 36 and 38 in gear housing 22 and prevent movement between gear housings 22 and 26.

As depicted in FIG. 1 there is a first planetary worm/gear 14 and a second planetary worm/gear 14a on planetary carrier 18. These planetary worm/gears are supported on said planetary carrier 18 for rotation thereon by support shafts. First support shaft 44 supports first planetary worm/gear 14 and second support shaft 46 supports second planetary worm/gear 14a. Each of these suport shafts 44 and 46 is pressed into its respective shaft receptacles, which are provided in the planetary carrier 18.

Figures 4, 6, 7:
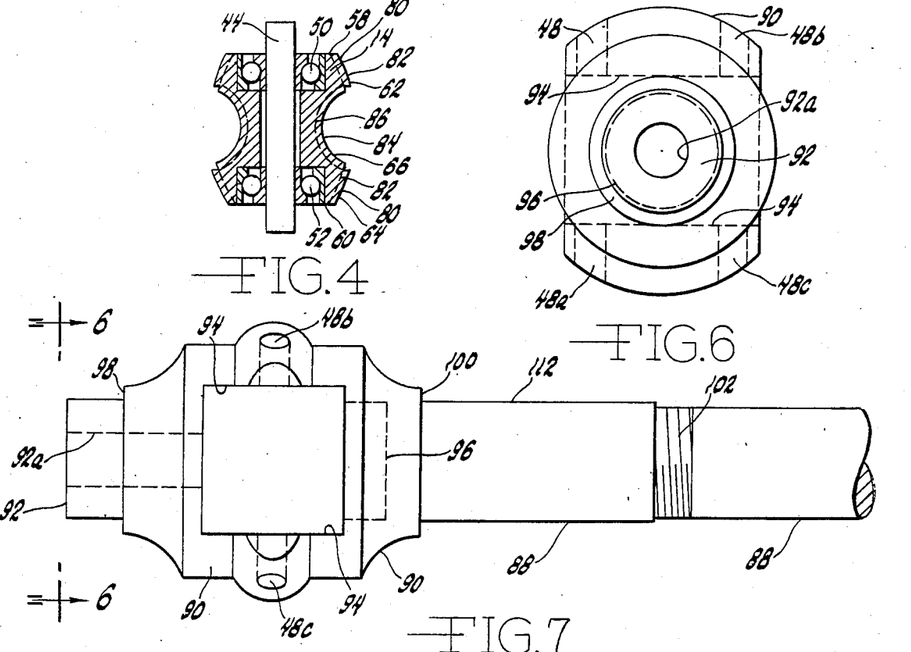
FIG. 4 is a sectional view of the embodiment of the invention depicted in FIG. 1 taken along line 4—4.
FIG. 6 is an end view of the embodiment of the invention depicted in FIG. 7 taken along line 6—6.
FIG. 7 is a side view taken along line 7—7 of FIG. 1.

FIGS. 2, 6 and 7 provide a more complete view of these shaft receptacles. An end of first support shaft 44 is pressed into receptacle 48; and other end is pressed into opposed second receptacle 48a. Similarly, an end of second support shaft 46 is pressed into third receptacle 48b and the other end of second support shaft 46 is pressed into fourth receptacle 48c.

The manner in which planetary support shaft 44 passes through and supports planetary worm/gear 14 is depicted in FIG. 4. First support shaft bearing 50 and second support shaft bearing 52 are spaced apart and provided on shaft 44. These support shaft bearings are journal thrust bearings. Thus, carrier 18 supports first support shaft 44 which in turn supports bearings 50 and 52, which in turn supports first planetary worm/gear 14. The position of the planetary worm/gear 14 on the carrier 18 is thus permanently fixed relative to said carrier 18. Second planetary worm/gear 14a is similarly supported.

Figures 3, 3A:
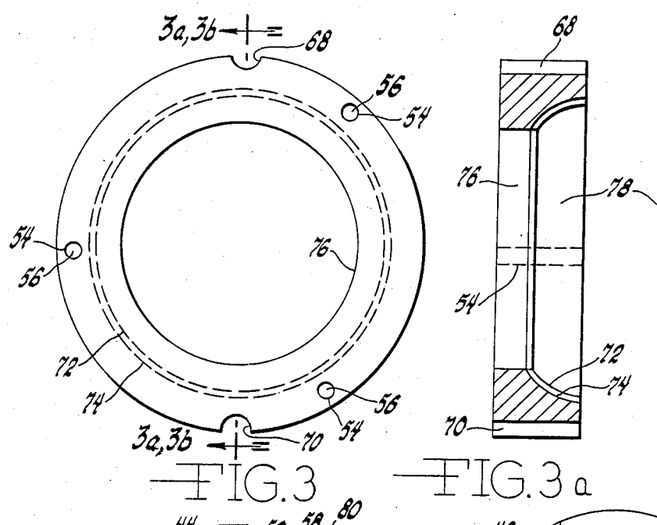
FIG. 3 is an end view of an internal, split ring worm gear taken along line 2—2 of FIG. 1.
FIG. 3a is a sectional view of the embodiment of the invention depicted in FIG. 3 taken along line 3ab—3ab.
Figure 3B:
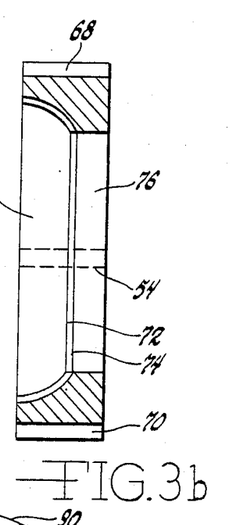
FIG. 3b is a sectional view of the embodiment of the invention depicted in FIG. 3 taken along line 3ab—3ab.

As depicted in FIGS. 2, 3a, and 3b split ring 36 and split ring 38 each have a set of locating pin holes 54 which are unequally spaced apart. There are three locating pins 56. Each locating pin 56 must be insertable in the two corresponding locating pin holes on the two split rings when the split rings are properly aligned. Because of the spacing of the locating pin holes 54, only proper alignment is allowed.

As depicted in FIG. 2, first planetary worm/gear 14 is essentially barrel shaped, having a first end 58, a second end 60, a first exterior section 62 adjacent said first end 58, and a second exterior section 64 adjacent said second end 60, and an exterior, concave, mid section 66 intermediate said first exterior section 62 and said second exterior section 64. Second planetary worm/gear 14a is similarly constructed.

As depicted in FIG. 2, primary worm 12 is a coaxial sleeve located on input shaft 30. Said input worm 12 communicates with and is intermediate planetary worm/gears 14 and 14a; which in turn are mounted on planetary carrier 18 for rotation thereon. Said planetary worm/gears communicate with and are located within split ring, double enveloping, internal, worm gear 16 which is in turn stationarily affixed to gear housing 22 and motor-gear housing 26.

An end view of split ring, double enveloping, internal, worm gear 16 is depicted in FIG. 3. Also depicted are partial views of first receptacle 68 for first pin 40 and second receptacle 70 for second pin 42. Also depicted are locating pin holes 54, and locating pins 56.

Top land diameter 72 and the root diameter 74 of the internal gear teeth for the split ring, internal, double enveloping worm gear 16 is also depicted in FIG. 3.

FIG. 3a is a cross-section of FIG. 3 taken along line 3ab—3ab. The shape of the internal geared surface of split ring 38 is depicted. First pin receptacle 68 and second pin receptacle 70 are located 180° apart. Locating pin holes 54 and locating pins 56 are intermediate said pin receptacles 68 and 70. Top land diameter 72 and root diameter 74 are depicted within said split ring 38, and are also depicted in FIG. 3b within said split ring 36.

Shaft receptacle 76 provides clearance for the planetary carrier 18. The teeth for the split ring, double enveloping worm gear 16 are cut upon contoured surface 78.

FIG. 3b is split ring 36 which is depicted as the mirror image of split ring 38 depicted in FIG. 3a.

Another view of planetary worm/gear 14 is depicted in FIG. 4. The essentially barrel shape of the planet is shown in a cross-sectional view of the planetary worm gear. First support shaft 44 extends from and through first end 58 to and through second end 60. Shaft 44 supports first journal thrust bearing 50, which in turn supports said planet 14 at first end 58. Shaft 44 supports said second journal thrust bearing 52, which in turn supports said planet 14 at second end 60.

Planetary worm threads 80 are loaced on both first and second exterior sections 62 and 64 of said planetary worm/gear. Said planetary worm threads 80 have root diameter 82.

Mid section 66 is concave and includes gear teeth having top land 84 and root 86.

Figure 5:
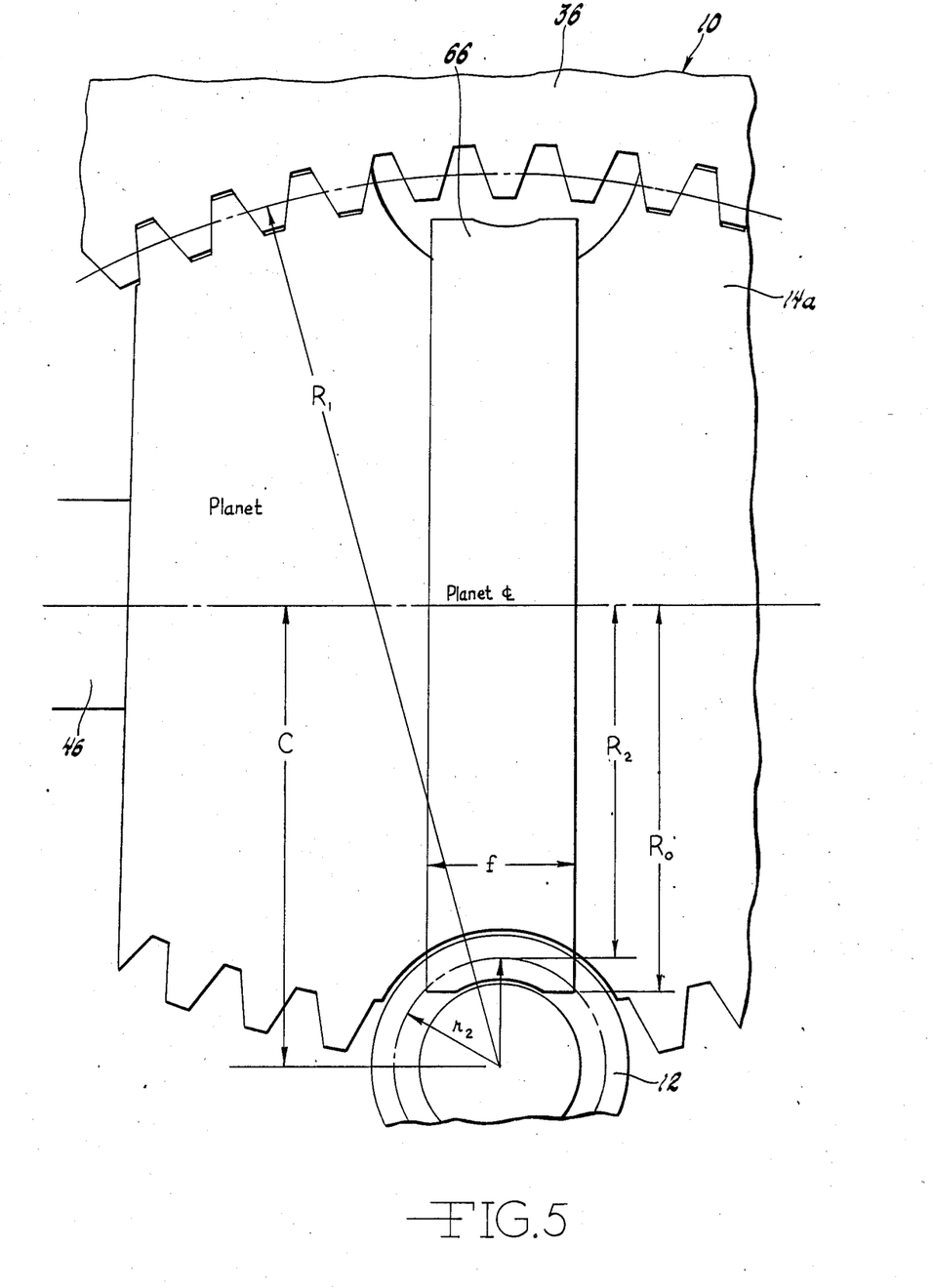
FIG. 5 is a sectional view of an internal, split ring, double enveloping, double reduction gear set.

FIG. 5 is a schematic view of an embodiment of this invention.

EXTERNAL GEAR SET

An external gear set may be defined as the gear set including input worm 12 and planetary worm/gear 14.

The external gear set may consist of a conventional cylindrical helicoidal worm having n2 threads and a pitch radius r2. It may be made by conventional methods and is preferably made of hardened and ground steel.

Its mate may be a conventional single-enveloping worm gear with N2 teeth and a pitch R2, and constitutes the central section of barrel shaped planet 14. Its outside radius RO must be small enough to clear the teeth of internal ring gear 16.

If the planet is made in three sections, the worm gear may be made of bronze with first end 58 and second end 60 being made of steel.

INTERNAL GEAR SET

The internal gear set is of a type not heretofor used. It includes an internal, double enveloping gear set. In other double enveloping sets, the worm is hour-glass shaped to fit the gear. In the design of this invention, planetary worm/gear 14 is barrel shaped, having a mid section 66 which is a central groove containing the external worm gear.

The method used to cut the threads is similar to that used to cut hour glass worms: a tool (usually straight sided) is rotated about the center of the mating internal gear while the planet rotates in a timed relation thereto. The tool cutting edges are in or near to an axial plane of the planet. The rotational ratio is that of the geared pair. Modification of this method may be used to improve or to eliminate interference.

The mating internal gear can be hobbed by a hob whose imaginary tooth surface is identical to the barrel shaped worm except that the hob is slightly longer than the worm, and that the hob tooth thicknesses are reduced by rotation about the turning center of the tool enough that the gear tooth mutilation during hob infeed can be removed by side cutting. This method is the same as is used on external double enveloping gears.

TOOTH NUMBERS

It is preferred that the two planets 14 and 14a be identical. Otherwise any tooth numbers can be chosen for the gear members and any number of threads for the worms. However if the number of threads on the input shaft (n2) is odd, then the number of teeth on the internal gear (N1) must be odd. Similarly, if n2 is even, then N1 must be even.

GEAR DESIGN EQUATIONS
MAXWELL INTERNAL, DOUBLE ENVELOPING
DOUBLE REDUCTION, PLANETARY WORM GEAR

Internal Mesh

| | |
|---|---|
| $N_1$ teeth in internal ring gear* | 71 |
| $n_1$ threads on barrel-shaped worm (on planet) | 1 |
| $R_1$ pitch radius of internal gear | 2.000 |
| $a_1 = 2R_1/N_1$ addendum | .0563 |
| $b_1 = 1.2\, a_1$ dedendum | .0676 |
| $C = \frac{1}{2}(R_1 + a_1)$ center distance | 1.0282 |

External Mesh

| | |
|---|---|
| $N_2$ teeth in external gear (on planet) | 31 |
| $n_2$ threads on input worm | 1 |
| $r_2 \cong C/(1 + N_2 \text{ TAN } 6°)$ pitch radius of input worm | .2415 |
| $R_2 = C - r_2$ | .7867 |
| $a_2 = 2R_2/N_2$ addendum | .0508 |
| $b_2 = 1.2\, a_2$ dedendum | .0609 |

$$F \cong 2\sqrt{(r_2 + a_2)^2 - r_2^2} \quad \text{face width of gear} \quad .3293$$

$$R_0 \cong C - \sqrt{(r_2 - a_2)^2\, .09 F^2} \quad \text{gear outer radius} \quad .8651$$

$$(R_0 + c)^2 + (\tfrac{1}{2}F)^2 (R_1 - b_1) \text{ test} \quad \left\{ \begin{array}{l} 1.9004 \\ 1.9324 \end{array} \right.$$

(A slight adjustment, possibly an increase in $r_2$ may be necessary)
*If $n_2$ is odd, then $N_1$ is odd.
If $n_2$ is even, then $N_1$ is even As depicted in FIG. 7 planetary carrier 18 may include output shaft portion 88. In the embodiment depicted, planetary carrier 18 has a forward section 90 with an input shaft receiving front end 92 having input shaft receptacle 92a; a central planetary worm gear receptacle 94, shaft receptacles for planetary worm gear support shaft, and a journal thrust bearing shaft receptacle 96 for journal thrust bearing 34.

The rear end of the planetary carrier 18 has an output shaft portion 88 of reduced diameter extending therefrom. The forward section of the planetary carrier is referred to as forward section 90. Forward section 90 has a forward shoulder 98; and a rearward shoulder 100 which abut their respective journal thrust bearings 28 as depicted in FIG. 1. There is a journal thrust bearing surface 110 forward of forward shoulder 98, and a second journal thrust bearing surfaces 112 rearward of rearward shoulder 100.

Output shaft portion 88 includes external threads 102 for receiving a locking nut 104, as depicted in FIG. 1. Locking nut 104 is placed on the threads 102 and tightened against rearward most journal thrust bearing 28. A snap ring 106 retains the outer race 108 of the above journal thrust bearing, also depicted in FIG. 1.

FIG. 6 depicts planetary support shaft receptacles 48, 48a, 48b and 48c, input shaft receiving front end 92 having input shaft receptacle 92a, a central planetary worm gear receptcle 94, journal thrust bearing shaft receptacle 96, and a forward shoulder 98.

Figure 8:
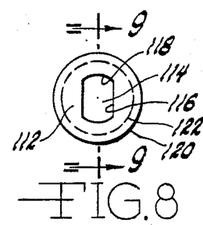
FIG. 8 is an end view of the embodiment of the invention of FIG. 1 taken along line 8—8.
Figure 9:
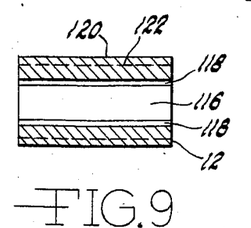
FIG. 9 is a cross sectional view of the embodiment of the invention depicted in FIG. 8 taken along line 9—9.

As depicted in FIGS. 8 and 9, primary worm 12 has a primary worm input shaft receiving receptacle 114. Said receptacle 114 has two opposing straight surfaces 116 and two opposing concave surfaces 118 for matingly receiving input shaft 30 in a splined manner. Input worm 12 has worm threads on its surface with top land 120 and root diameter 122.

Figures 10, 11:
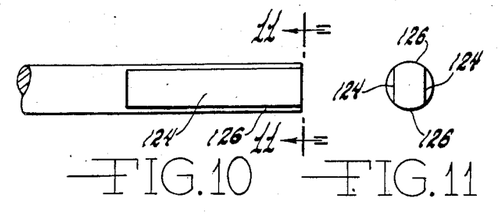
FIG. 10 is side view of the input shaft of FIG. 1.
FIG. 11 is a end view of the embodiment of the present invention of FIG. 10 taken along line 11—11.

As depicted in FIGS. 10 and 11, input shaft 30 is shaped to snugly mate with input worm input shaft receiving receptacle 114. Thus, input shaft 30 has two opposing straight surfaces 124 and two opposing convex surfaces 126.

There are other embodiments of the invention in addition to the first embodiment of the invention described above.

Figure 12:
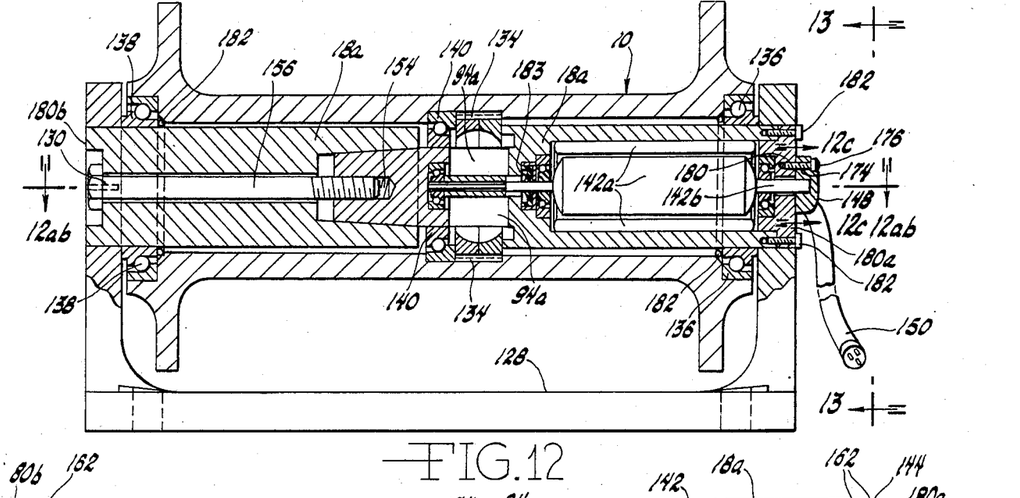
FIG. 12 is a cross sectional view of a second embodiment of the invention.
Figures 12A, 12B, 12C, 12D, 12E, 13:
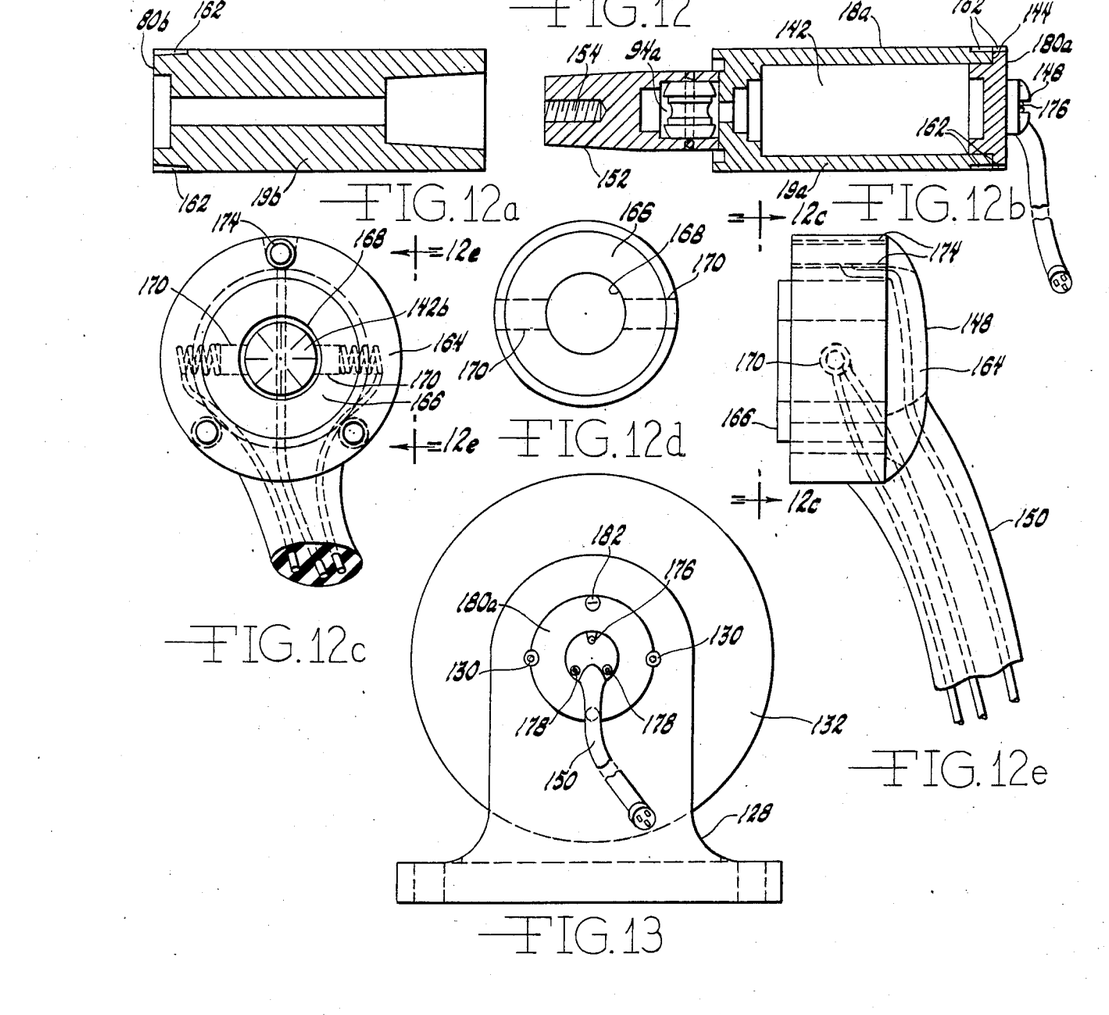
FIG. 12a is a view of the embodiment of the present invention of FIG. 12 taken along line 12a,b—12a,b.
FIG. 12b is a view of the embodiment of the present invention of FIG. 12 taken along line 12a,b—12a,b.
FIG. 12c is a view of the embodiment of the present invention of FIG. 12 taken along line 12c—12c.
FIG. 12d is a view of the embodiment of the present invention of FIG. 12 taken along line 12c—12c.
FIG. 12e is a view of the embodiment of the present invention depicted in FIG. 12c along line 12e—12e.
FIG. 13 is an end view of the embodiment of the invention of FIG. 12 taken along line 13—13.

A second embodiment of the invention, which may be utilized as a winch, is depicted in FIGS. 12–13. In principle this device works very much like the first embodiment described above. The distinguishing features of this embodiment are that planetary carrier 18a is held stationary to its support bracket 128 by tapered pins 130, and the split ring, internal, double enveloping worm gear 16 rotates about said stationary planetary carrier 18a.

Said split ring, internal, double enveloping worm gear is located within an output drum 132 and splined thereto by anti-rotation pins 134.

Output drum 132 is journaled for rotation at a first end by journal bearing 136, at the opposing end by journal thrust bearing 138, and at an intermediate position by journal thrust bearing 140.

Planetary carrier 18a, includes a first planetary carrier section 19a and a second planetary carrier section 19b. Planetary carrier 18a is so sectioned to facilitate installation of the split ring, internal, double enveloping worm gear 16 and to facilitate installation in output drum 132.

First planetary carrier section 19a has a motor receptacle 142 for motor 142a adjacent motor end 144 and a motor end cap 146 on motor end 144. Motor end cap 146 also includes armature housing 148 which in turn includes electrical supply cord 150 and armature 142b.

First planetary carrier section 19a also has a planetary worm/gear receptacle 94a communicating with motor receptacle 142, an input shaft seal 183 and drum seals 182 are provided.

First planetary carrier section 19a has a mating end 152 for said second planetary carrier section 19b. Said mating end 152 has internal threads 154 for receiving a draw bolt 156.

Second planetary carrier section 19b has a first mating end 158 for receiving mating end 152 of first planetary carrier section 19a. A draw bolt receptacle 160 is also provided. Mating end 152 is positioned within first mating end 158. Draw bolt 156 is inserted in draw bolt receptacle 160, screwed into internal threads 154 and tightened.

Planetary carrier 18a and support bracket 128 have four tapered pin receptacles 162 spaced 180° apart for receiving tapered pins 130: Two pins spaced 180° apart at first end 180a, and two pins spaced 180° apart at second end 180b.

Armature housing 148 is more fully depicted in figures 12c–13. Armature housing 148 has an insulative, water repellant rubber exterior 164. Said housing 148 is essentially circular and has a central portion 166. Central portion 166 is constructed of a nonconductive rigid material and contains a circular armature receptacle 168, two brush receptacles 170 positioned 180° apart and at the periphery of armature receptacle 168. Armature brush spring 172 is positioned within brush receptacle 170 and then molded into rubber exterior 164.

An electrical cord 150 is also molded into rubber exterior 164. Said cord 150 is grounded to motor end cap 144 by grounding sleeve 174 and grounding screw 176.

Armature housing fastening screws 178 are provided in the armature housing 148 for fastening said armature housing 148 to motor end cap 146.

Motor end cap 146 has end cap fastening receptacles 180 for fastening said end cap 146 to said planetary carrier 18a, and fastening screws 182 for same.

The following embodiments of the invention have a input worm 12, a planetary worm/gear 14 interacting with both said input worm 12 and split ring, internal, double enveloping worm gear 16.

Figures 14, 14A, 15, 15A:
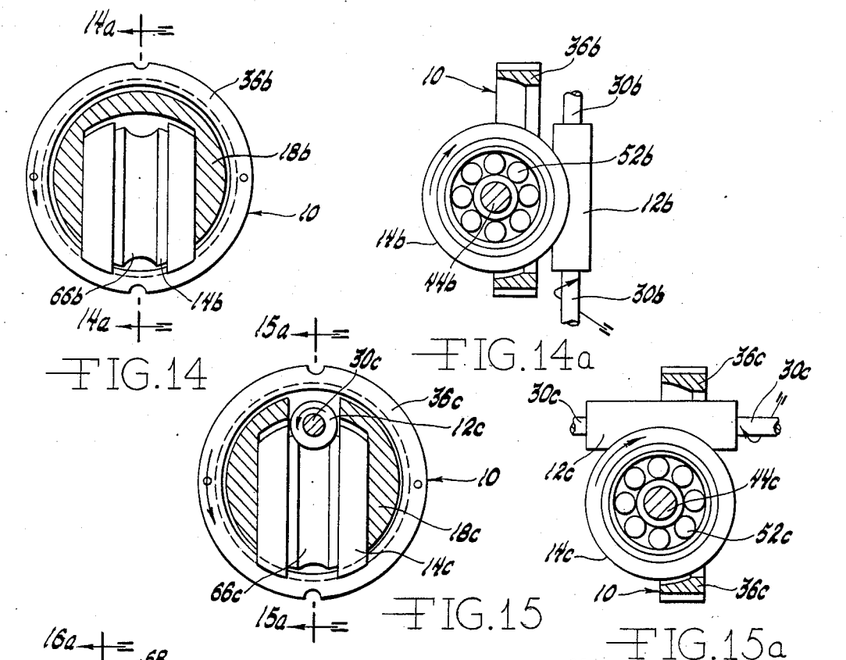

A third embodiment of the invention is depicted in FIGS. 14 and 14a. In this third embodiment, the axis of rotation of input worm 12b (i.e. input shaft 30b having coaxial input worm 12b thereon) is at 90° to the axis of rotation of split ring, internal, double enveloping worm gear 36b which is an integral part of the output shaft. (The output shaft is not shown.)

In this third embodiment, planetary carrier 18b is an integral and fixed stationary part of stationary gear housing 22b. Because planetary carrier 18b is stationary it cannot move, but the single planetary worm/gear 14b provided in this embodiment can still revolve upon planetary support shaft 44b. Assuming that all threads and their corresponding gears are right-handed, if input worm 12b rotates in a clockwise direction, split ring, internal, double enveloping worm gear 36b and the output shaft will rotate in a counter-clockwise manner.

It is believed that this configuration allows for the largest diameter planetary worm/gear relative to input worm 12b and split ring, internal, double enveloping worm gear 36b. Since the larger the diameter of the planetary worm/gear 14b the more gear teeth there can be on it, this configuration allows for a greater reduction in the first gear set than is depicted in the embodiments depicted in FIGS. 15–18, the first gear set being composed of input worm 12b and planetary worm/gear 14b.

A Fourth embodiment of the invention is depicted in FIGS. 15 and 15a. In this fourth embodiment the input and output are parallel but offset from one another. Planetary carrier 18c is a part of gear housing 22c, and both planetary carrier 18c and gear housing 22c are stationary. A single planetary worm/gear 14c is provided which can only rotate upon the axis afforded by planetary support shaft 44c. Input worm 12c is tangent to planetary worm/gear mid section 66c. Split ring, internal, double enveloping worm gear 36c is a circular gear stationarily affixed within output shaft 88c. Input worm 12c turns planetary worm/gear 14c which in turn turns split ring, internal, double enveloping worm gear 36c and the output shaft 88c. The axis of rotation of output shaft 88c is parallel to the axis of rotation of input worm 12c but offset from it.

Assuming that all threads and their corresponding gears in the fourth embodiment are right handed, if input worm 12c is turned in a clockwise direction, then the output shaft 88c will turn in a counter-clockwise direction. This embodiment allows for high reduction in so much as the planetary worm/gear 14c is larger than its corresponding input worm or split ring, internal, double enveloping worm gear than the embodiments of the invention depicted in FIGS. 16–18.

Figure 16:
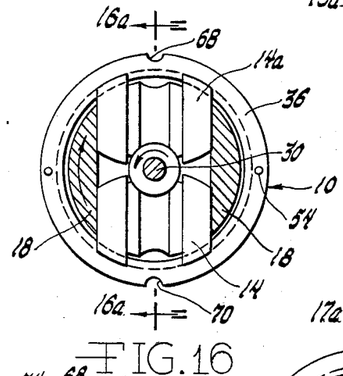
FIG. 16 is an end view of another embodiment of the invention.
Figure 16A:
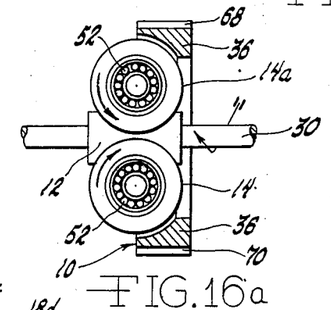

Another view of the First embodiment of the invention depicted in FIG. 1, is depicted in FIGS. 16 and 16a. In this embodiment, assuming right hand threads, if the primary worm 12 is rotated in a clockwise direction, then the planetary carrier 18 will rotate in a clockwise manner as shown.

FIGS. 16 and 16a may also be considered to depict the embodiment of the invention depicted in FIGS. 12–12b. In that embodiment planetary carrier 18a is held stationary. Thus the output is split ring, internal, double enveloping worm gear 36 and the input is input worm 12. Assuming a right handed thread system, when primary worm 12 rotates clockwise, the output will be counterclockwise.

The embodiment depicted in FIGS. 16 and 16a is the strongest of the embodiments depicted because it utilizes two planetary worm/gears for engaging split ring, internal, double enveloping worm gear 36 at its pitch diameter instead of its pitch radius. That is split ring, internal, double enveloping worm gear 36 is engaged at two different sections 180° apart by the planetary worm/gears 14 and 14a.

Figure 17:
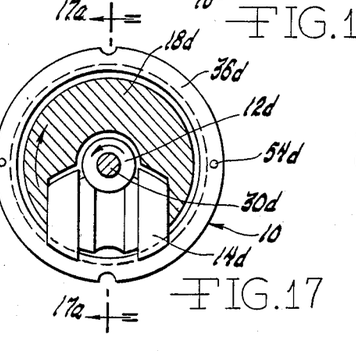
FIG. 17 is an end view of another embodiment of the invention.
Figure 17A:
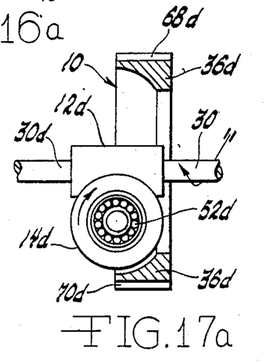

A Fifth embodiment of the invention is depicted in FIGS. 17 and 17a. Except for the fact that only one planetary worm/gear is utilized and thus planetary carrier 18d need only be configured for one planet, this fifth embodiment is the same as the embodiment depicted in FIGS. 1, 2, 16 and 16a. The same reductions are availbe. However, only the pitch radius is available in this Fifth embodiment, whereas the pitch diameter is available for the embodiments of FIGS. 1, 2, 16 and 16a. Thus the Fifth embodiment has lighter load capabilities.

Figure 18:
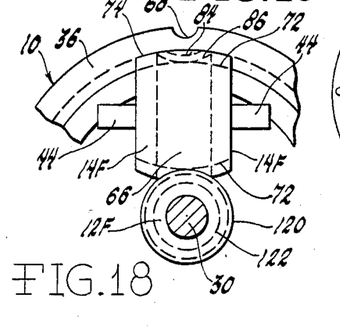
FIG. 18 is a sectional view of a gear assembly.

As depicted in FIG. 18, the barrel shaped planetary worm/gear 14f can have a convex mid-section 66. In the depicted embodiment, instead of having a first exterior section (i.e. first adjacent surface) 62 and a second exterior section (i.e. second adjacent surface) 64, there is only one continuous surface 63 extending from first end 58 to second end 60. Mid-section 66 has gear teeth cut thereon about the circumference of the barrel shaped planetary worm/gear 14f. These gear teeth are cut to a depth equal to the root 72 of the worm threads. An hour glass shaped input worm may be used to increase the tooth contact and the strength of the first reduction. However, FIG. 18 depicts the use of a standard input worm 12F.

Where the same number is used to describe parts in different embodiments, occasionally a letter suffix is added. That suffix is used to because the part is in a different embodiment. Generally, the suffix is not necessary because the numbered part is generically the same as other like numbered parts, but is added for clarity.

In operation, the motor is utilized to turn input worm 12. Input worm 12 engages planetary worm gear 14 for a first reduction. Planetary worm gear 14 engages splitting, internal double enveloping worm gear 16 for a second reduction. The output can be taken from carrier 18 or split ring, internal double enveloping worm gear 16.

Although there have been described what are at present considered to be the preferred embodiments of the invention, it will be understood that the invention may be embodied in other specific forms without departing form the spirit or essential characteristics thereof. The present embodiments are therefore to be considered in all respects as illustrative, and not restrictive. The scope of the invention is indicated by the appended claims rather than by the foregoing description.

I claim:

1. A gear assembly comprising, in combination:
a gear assembly housing;
an input shaft for said housing;
a gear assembly in said housing;
said gear assembly including an input worm fixedly attached to said input shaft;
a planetary carrier having a barrel shaped planetary worm/gear enveloping said input worm; and
a double enveloping internal worm gear enveloping said planetary worm/gear;
wherein said barrel shaped planetary worm/gear includes a first end;
an opposing second end;
a concave mid-section intermediate said first end and said second end;
a first surface intermediate said first end and said mid-section;
a second surface intermediate said second end and said concave mid-section;
said first and said second surface each having worm threads thereon for engaging said split ring, internal, double enveloping worm gear; and
said concave mid-section having gear teeth thereon about the circumference of said planetary worm/gear at its mid section for engaging said input worm.

2. The gear assembly of claim 1, wherein said first surface and said second surface are convex.

3. The gear assembly of claim 2, wherein said planetary carrier is the output.

4. The gear assembly of claim 2, wherein said double enveloping internal worm gear is the output.

5. The gear assembly of claim 1, wherein said internal, double enveloping worm gear is a split ring.

6. The gear assembly of claim 1, wherein said planetary carrier has more than one barrel shaped planetary worm/gear thereon engaging said input worm.

* * * * *